US008297811B2

United States Patent
Mukai et al.

(10) Patent No.: US 8,297,811 B2
(45) Date of Patent: Oct. 30, 2012

(54) AIRCRAFT LAMP

(75) Inventors: Tomoyuki Mukai, Shizuoka (JP); Makoto Nawa, Shizuoka (JP); Shigeo Sawada, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 623 days.

(21) Appl. No.: 12/509,850

(22) Filed: Jul. 27, 2009

(65) Prior Publication Data

US 2010/0020557 A1    Jan. 28, 2010

(30) Foreign Application Priority Data

Jul. 28, 2008    (JP) ................. 2008-193891
Jul. 28, 2008    (JP) ................. 2008-193892

(51) Int. Cl.
*B64D 47/02*    (2006.01)
(52) U.S. Cl. ........ 362/470; 362/264; 362/265; 362/345; 362/519; 362/646
(58) Field of Classification Search .......... 362/263–265, 362/345, 470–472, 519, 646, 657–659
See application file for complete search history.

(56) References Cited

U.S. PATENT DOCUMENTS

| 5,727,863 | A | * | 3/1998 | Pruett .......................... 362/470 |
| 6,111,359 | A | * | 8/2000 | Work et al. .................... 315/56 |
| 6,191,547 | B1 | | 2/2001 | Fricke et al. |
| 6,376,992 | B1 | * | 4/2002 | Petrick ......................... 315/82 |

FOREIGN PATENT DOCUMENTS

JP    01-279503 A    11/1989
JP    2001-266603 A    9/2001

OTHER PUBLICATIONS

English abstract of JP2001266603 published Sep. 28, 2011, esp@cenet database, 1 page.
English abstract of JP1279503 published Nov. 9, 1989, esp@cenet database, 1 page.

* cited by examiner

*Primary Examiner* — Stephen F Husar
(74) *Attorney, Agent, or Firm* — Osha Liang LLP

(57) ABSTRACT

An aircraft lamp includes a housing capable of being attached to a body of an aircraft; a discharge lamp; a reflector which reflects visible light from the discharge lamp; a light transmissive cover which transmits reflected light from the reflector to a front side of the housing; a lamp socket connected electrically to the discharge lamp and an igniter which activates the discharge lamp; and a high-voltage electrical power line that electrically connects the lamp socket with the igniter. The discharge lamp, the reflector, the light transmissive cover, the lamp socket, and the igniter are provided within the housing. A heat insulating air layer is provided between the lamp socket and the igniter. The high-voltage electrical power line is provided so as to pass through the heat insulating air layer.

14 Claims, 5 Drawing Sheets

AIRCRAFT LAMP

BACKGROUND OF INVENTION

1. Field of the Invention

The present invention relates to an aircraft lamp which includes a discharge lamp and reflector in a lamp housing.

2. Related Art

Conventionally, there have been known lamps employing discharge lamps as light sources which are used as exterior lamps attached to exterior portions of a body of an aircraft. For example, Japanese Patent Unexamined Publication JP-A-2001-266603 describes a searchlight which includes a housing, which is attached to an exterior portion of a body of a helicopter or an airplane, and a discharge lamp and a reflector, which are housed inside the housing. In addition, Japanese Patent Unexamined Publication JP-A-1-279503 describes a technique for a recognition light for an aircraft in which a reflecting film (a cold mirror), which can transmit infrared radiation, is provided on a reflector for transmitting heat generated in a light source to the rear of the reflector, so as to suppress the increase in temperature in front of the reflector.

Incidentally, although it is normal practice to use a discharge lamp together with an igniter for instantaneous activation, in the event that the igniter is installed in a position in an interior of the body of an aircraft, which lies far away from the discharge lamp, the starting voltage tends to drop easily. For example, in the case of an aircraft exterior lamp to which a high power (for example, 250 W) is supplied, due to an igniter generating a high-voltage pulse of the order of ±18 KV, in the event that this starting voltage drops, the burning capability of the discharge lamp is lowered. Consequently, although it is desirable that the igniter is installed on the housing together with the discharge lamp, in such cases, the interior of the housing is heated to high temperatures by heat generated by the discharge lamp and heat generated by the igniter. In particular, in aircraft lamps in which a discharge lamp generating a large quantity of light and a high-output igniter are installed side by side in a housing of limited size, in addition to a heat resistant construction, a construction is required which ensures a high degree of insulation.

Further, as aircraft lamps of this type, conventionally, there have been known exterior lamps which are equipped at exterior portions of bodies of aircraft, and landing lights, tailplane lights, logo lights, searchlights and the like are included in those exterior lamps. For example, the JP-A-2001-266603 describes a searchlight which includes a housing, which is attached to an exterior portion of a body of a helicopter or an aircraft having starboard and port wings, and a discharge lamp and a reflector, which are housed inside the housing.

Incidentally, because aircraft lamps are kept lit over a long period of time, light sources and other constituent parts must be inspected periodically for repair and replacement. In addition, in a case where the next scheduled flight of an aircraft is imminent, the maintenance work needs to be carried out within a limited period of time. With the conventional aircraft lamps, however, in particular, detaching and re-attaching of electric wiring therefrom and thereto takes some labor hours, leading to a problem that many hours are required for maintenance thereof.

SUMMARY OF INVENTION

One or more embodiments of the present invention provide a small aircraft lamp which has a construction which ensures a high degree of heat resistance and insulation.

Further, one or more embodiments of the present invention provide an aircraft lamp which enables the execution of simple and quick maintenance work thereon.

In accordance with one or more embodiments of the present invention, there is provided an aircraft lamp including: a housing capable of being attached to a body of an aircraft; a discharge lamp; a reflector which reflects visible light from the discharge lamp; a light transmissive cover which transmits reflected light from the reflector to a front side of the housing; and a lamp socket connected electrically to the discharge lamp and an igniter which activates the discharge lamp, wherein the discharge lamp, the reflector, the light transmissive cover, the lamp socket and the igniter are provided within the housing, wherein a heat insulating air layer is provided between the lamp socket and the igniter, and wherein a high-voltage electrical power line is provided so as to pass through the heat insulating air layer and electrically connects the lamp socket with the igniter.

Further, according to another aspect of one or more embodiments of the present invention, it is adaptable that the reflector is molded from a light transmissive material, and a reflecting film, which transmits infrared light of the discharge lamp towards the air layer, is provided on a front surface of the reflector. According to this aspect, the air layer functions as a heat insulator for the igniter and also functions as cooling medium for the discharge lamp.

Further, according to still another aspect of one or more embodiments of the present invention, it is adaptable that the reflector is attached to the lamp socket, a supporting surface of the lamp socket and an attaching surface of the igniter are disposed so as to be substantially at right angles to a direction in which the reflector is attached in the housing, and the air layer is formed between the supporting surface and the attaching surface. According to this aspect, the reflector can be accommodated in interior of the housing without reducing a capacity of the heat insulation air layer.

Furthermore, according to still another aspect of one or more embodiments of the present invention, it is adaptable that the lamp socket is made of an insulating material, a length of the lamp socket is longer than a length of a light emitting tube of the discharge lamp, electrode terminals are provided at longitudinal ends of the light emitting tube, and metallic terminal devices to which the electrode terminals are detachably attached are embedded in end portions of the lamp socket. According to this aspect, the electrical insulation between the discharge lamp and the lamp socket is firmly ensured.

In addition, according to still another aspect of one or more embodiments of the present invention, it is adaptable that the igniter includes a socket portion, which is made of an insulation material and projects into the air layer. One end of the high-voltage electrical power line is connected electrically to the terminal, and the other end of the high-voltage electrical power line is connected electrically to a connecting conductor, which is embedded in the socket portion. Also, a portion of the high-voltage electrical power line, which passes through the air layer, is covered with an insulating film. According to this aspect, the electrical insulation between the lamp socket and the igniter is firmly ensured without reducing the capacity of the heat insulation air layer.

According to the aircraft lamp of one or more embodiments of the present invention, because the lamp socket and the igniter are electrically connected together by the high-voltage electrical power lines, which pass through the air layer formed therebetween, there is provided a superior advantage that a high degree of heat and electricity insulating construction is installed in the interior of the small housing by suppressing the conduction of heat from the discharge lamp to the igniter and electrically insulating the power supply path from the igniter to the discharge lamp, so as to enhance the reliability of the lamp.

Further, according to another aspect of one or more embodiments of the present invention, there is provided an aircraft lamp including: a housing capable of being attached to a body of an aircraft; a light transmissive cover attached to a front side of the housing; a reflector accommodated inside the housing; a light source which is fixed to a front side of the reflector; an electrode terminal for the light source provided on a rear surface of the reflector so as to project therefrom; and a lamp socket including a power supply terminal provided in a rear side of the housing, wherein the reflector is detachably attached to the lamp socket so that the electrode terminal is electrically connected to and disconnected from the power supply terminal.

In addition, according to another aspect of one or more embodiments of the present invention, it is adaptable that the aircraft lamp further includes: a retainer, which fastens the light transmissive cover to the housing, and retainer securely holds the reflector between the light transmissive cover and the lamp socket. According to this aspect, the electrode terminal can be surely connected to the power supply electrode at an assembled state.

Although a filament-type bulb or a semiconductor light source such as an LED can also be used as the light source of such an exterior lamp, a discharge lamp which has a long service life and outputs a large quantity of light can preferably be used as the light source of the exterior lamp. Thus, according to another aspect of one or more embodiments of the present invention, with a view to illuminating brightly a predetermined area on the periphery of the aircraft, it is adaptable that the light source is a discharge lamp, and the discharge lamp is disposed so that a light emitting tube thereof becomes perpendicular to a direction in which the reflector is attached or detached.

In particular, when the aircraft lamp of one or more embodiments of the invention is applied to an aircraft exterior lamp to which high power (for example, 250 W) is supplied, an igniter generates a high-voltage pulse (a starting voltage) of the order of ±18 KV, for example. Because of this, it is desirable that the igniter is equipped integrally with the lamp so that the starting voltage of the discharge lamp is not dropped. In view of this, according to an aspect of one or more embodiments of the invention, it is adaptable that an igniter, which activates the discharge lamp, is assembled to the housing, and a high-voltage electrical power line is electrically connected to a socket portion of the igniter.

Here, although there is imposed no specific limitation on where to install the igniter, from the viewpoint of making the whole lamp smaller in size, the igniter is desirably installed in a rear end portion of the housing. According to an aspect of one or more embodiments of the present invention, it is adaptable that the housing including a front housing and a rear housing attached to a rear end of the front housing and the igniter is accommodated inside the rear housing.

According to the aircraft lamp of one or more embodiments of the present invention, because the light source is integrated into the reflector and the electrode terminals of the light source are made to be attached to and detached from the power supply terminals of the lamp socket, there is provided an advantage that the labor hours, which are conventionally required for attachment and detachment of electric wiring, can be eliminated, thereby making it possible to carry out the maintenance work simply and quickly.

Other aspects and advantages of the present invention will be apparent from the following description, the drawings, and the claims.

DETAILED DESCRIPTION

Hereinafter, exemplary embodiments of the invention will be described based on the included drawings.

Figure 1:
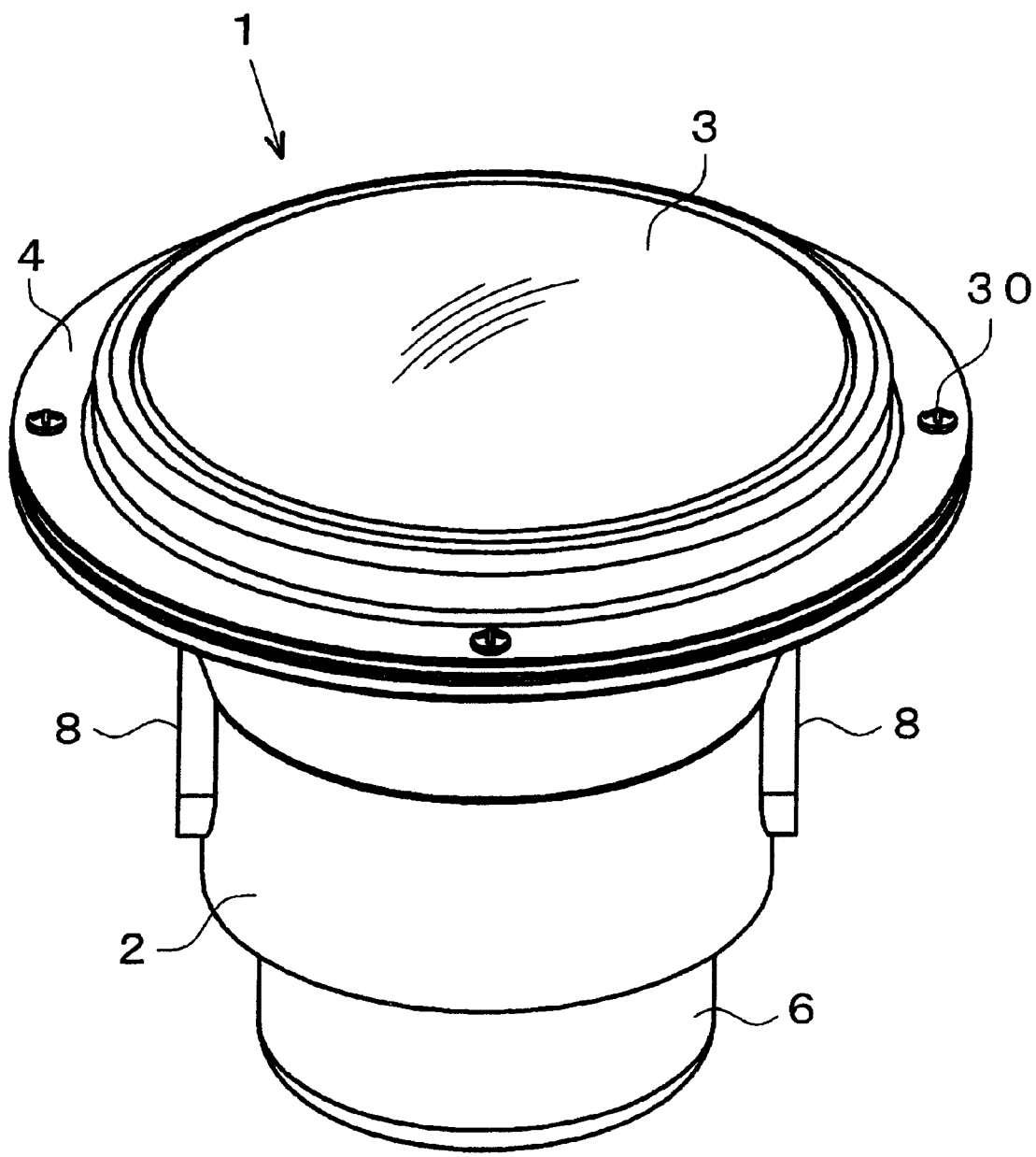
FIG. 1 is a perspective view showing an external appearance of an aircraft lamp according to an exemplary embodiment of the invention.
Figure 2:
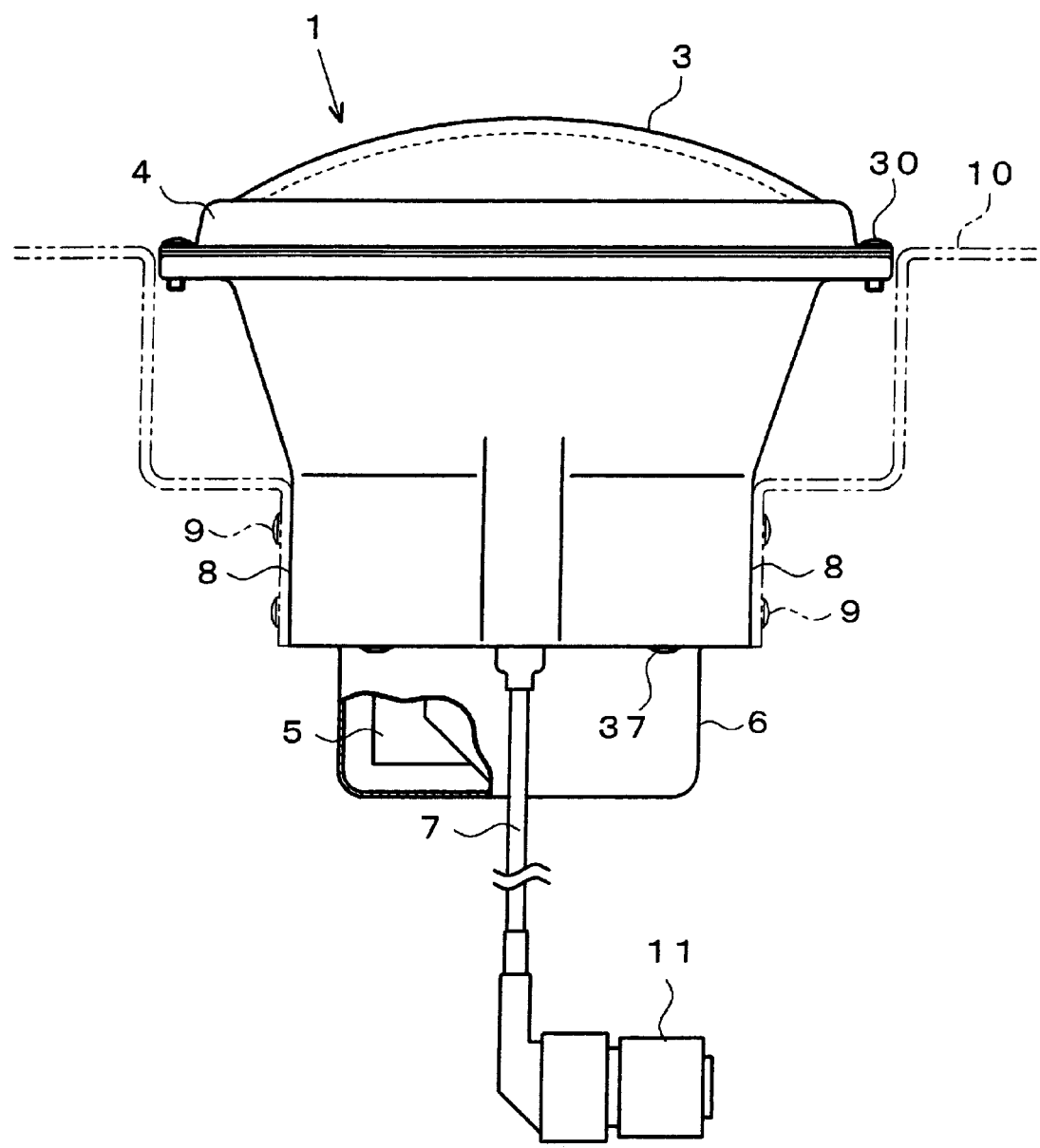
FIG. 2 is a side view showing a state in which the lamp is installed in a body of an aircraft.

As is shown in FIGS. 1 and 2, an aircraft lamp 1 of an exemplary embodiment includes a cup-shaped front housing 2. A light transmissive cover 3 is attached to a front surface of the front housing 2 with a retainer 4. A rear housing 6 is attached to a rear end of the front housing 2 for accommodating an igniter 5. A power supply shielded wire 7 is connected to the igniter 5. Here, a housing includes the front housing 2 and the rear housing 6 attached to the rear end of the front housing 2. A pair of attaching portions 8 are provided on an external surface of the front housing 2, and the front housing 2 is attached to a body 10 of an aircraft by screws 9 or bolts, which are screwed into the attaching portions 8. A plug 11 at a leading end of the shielded wire 7 is connected to a power supply circuit (whose illustration is omitted), which is installed in an interior of the body 10. Note that this lamp 1 is used as an external light of an aircraft, such as a landing light, a tailplane light, a recognition light, and a logo light, and that the front housing 2 is attached to an appropriate location on the body 10 depending upon the application of the lamp 1. The front housing 2 is formed of a metal material such as aluminum in order to provide easy attachment to the body 10 and ensure sufficient strength.

Figure 3:
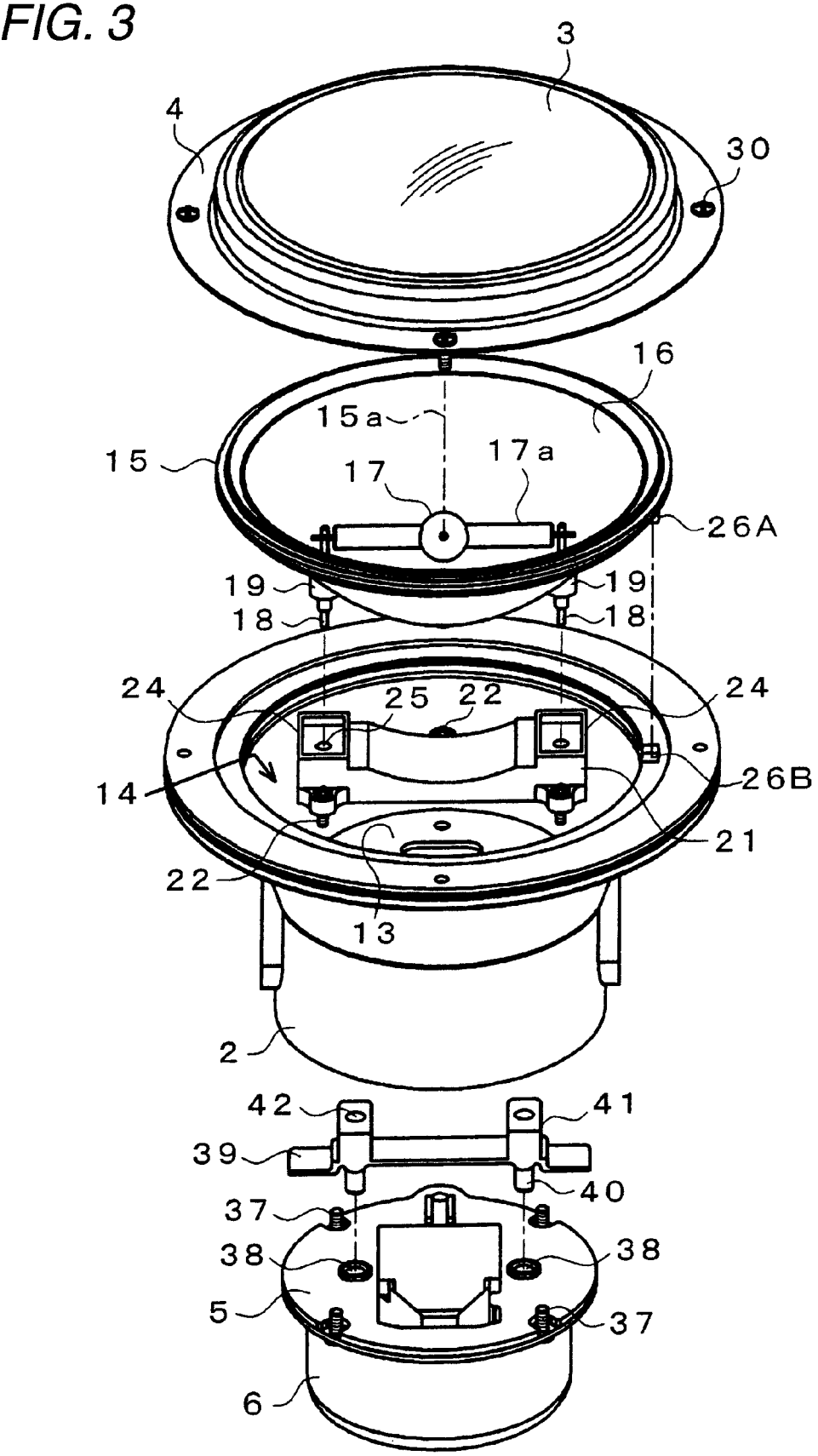
FIG. 3 is a perspective view showing an exploded state of the lamp.
Figure 4:
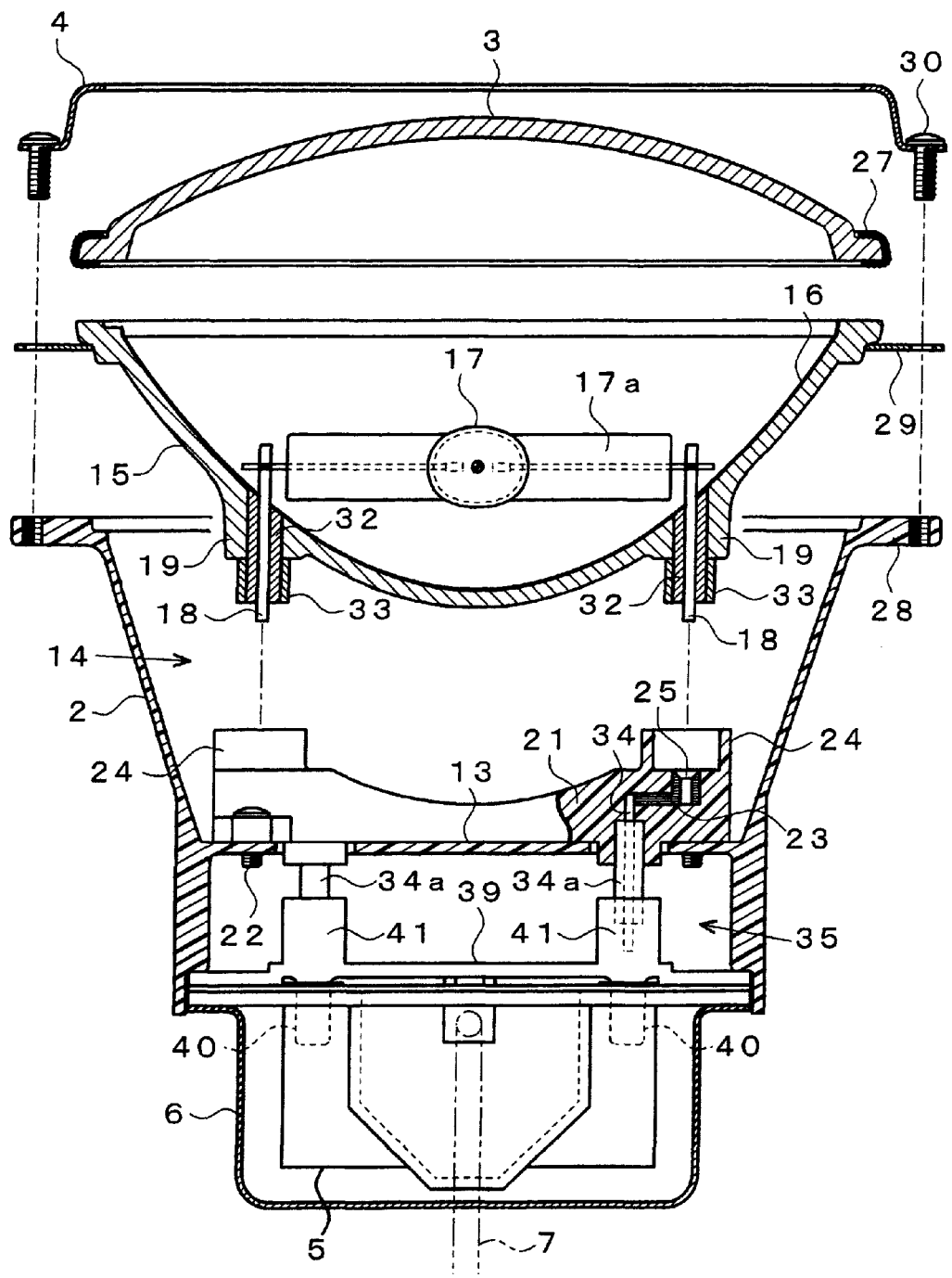
FIG. 4 is a sectional view showing the exploded state of the lamp.

As is shown in FIGS. 3 and 4, an inside of the front housing 2 is divided into front and rear compartments by a bulkhead 13, whereby a lamp compartment 14 is formed in front of the bulkhead 13, and a heat and electricity insulating air layer 35 is formed at the rear of the bulkhead 13. A reflector 15 is accommodated in the lamp compartment 14 and a reflecting surface 16 which is made up of a paraboloidal surface or a free curved surface is formed on a front surface of the reflector 15. A discharge lamp 17 is disposed substantially at a focal point position of the reflector 15, and electrode terminals 18 are secured to longitudinal ends of a light emitting tube 17a of the discharge lamp 17. The discharge lamp 17 is disposed so that the light emitting tube 17a becomes horizontal relative to a direction in which the reflector 15 is attached to the lamp compartment 14 (in the illustrated example, so that the light emitting tube 17a is at right angles to an optical axis 15a of the reflector 15), and the light emitting tube 17a is fixed to the reflector 15 by the electrode terminals 18. A pair of seating portions 19 are provided on a rear surface of the reflector 15 so as to project therefrom, and the electrode terminals 18 are made to pass through the corresponding seating portions 19 so as to project to a rear surface side of the reflector. Note that, in the case of the aircraft lamp 1 being applied to part of the aircraft lamps such as the logo light, the reflector 15 can also be attached to the front housing 2 so that a light emitting direction (the optical axis 15*a*) of the reflector 15 becomes oblique.

Visible light of the discharge lamp 17 is reflected on the reflecting surface 16, and reflected light from the reflector 15 is transmitted through the light transmissive cover 3 to thereby be shone to the front of the front housing 2. The light transmissive cover 3 is formed of a clear or colored glass to which an ultraviolet radiation cut-off treatment is applied so that ultraviolet radiation from the discharge lamp 17 is not emitted to the outside. The reflector 15 is molded from a light transmissive material (e.g., glass), and the reflecting surface 16 is formed by an infrared radiation transmissive reflecting film (e.g., a cold mirror as described in JP-A-1-279503). In addition, only visible light of the discharge lamp 17 is made to be reflected forwards by the reflecting surface 16, and infrared radiation (heat) of the discharge lamp 17 is made to pass through the reflecting film 16 and the reflector 15, so as to be let out into the air layer 35, which is situated behind the bulkhead 13.

A lamp socket 21 is disposed behind the reflector 15 and is fixed to a front surface of the bulkhead 13 (a supporting surface of the lamp socket 21) with a plurality of screws 22 at right angles to a direction in which the reflector 15 is attached thereto. The lamp socket 21 is formed of an insulating material, such as ceramic or resin, into a block-like shape, which is longer than the light emitting tube 17*a* of the discharge lamp 17. Metallic terminal devices 23 are embedded in both end portions of the lamp socket 21. Detachably supporting portions 24, which support detachably the reflector 15, are provided at both the end portions of the lamp socket 21 so as to project therefrom, and insertion ports 25 of the metallic terminal devices 23 are exposed from upper surfaces of the detachably supporting portions 24. In addition, in performing maintenance work for the lamp 1, with the light transmissive cover 3 removed, the reflector 15 is detached from and reattached to the lamp socket 21, so that the electrode terminals 18 can electrically be disconnected from and reconnected to the metallic terminal devices 23. In addition, raised and recessed positioning portions 26A, 26B are provided on confronting surfaces of the reflector 15 and the housing, respectively, so that the electrode terminals 18 can easily be inserted into the corresponding insertion ports 25.

Figure 5:
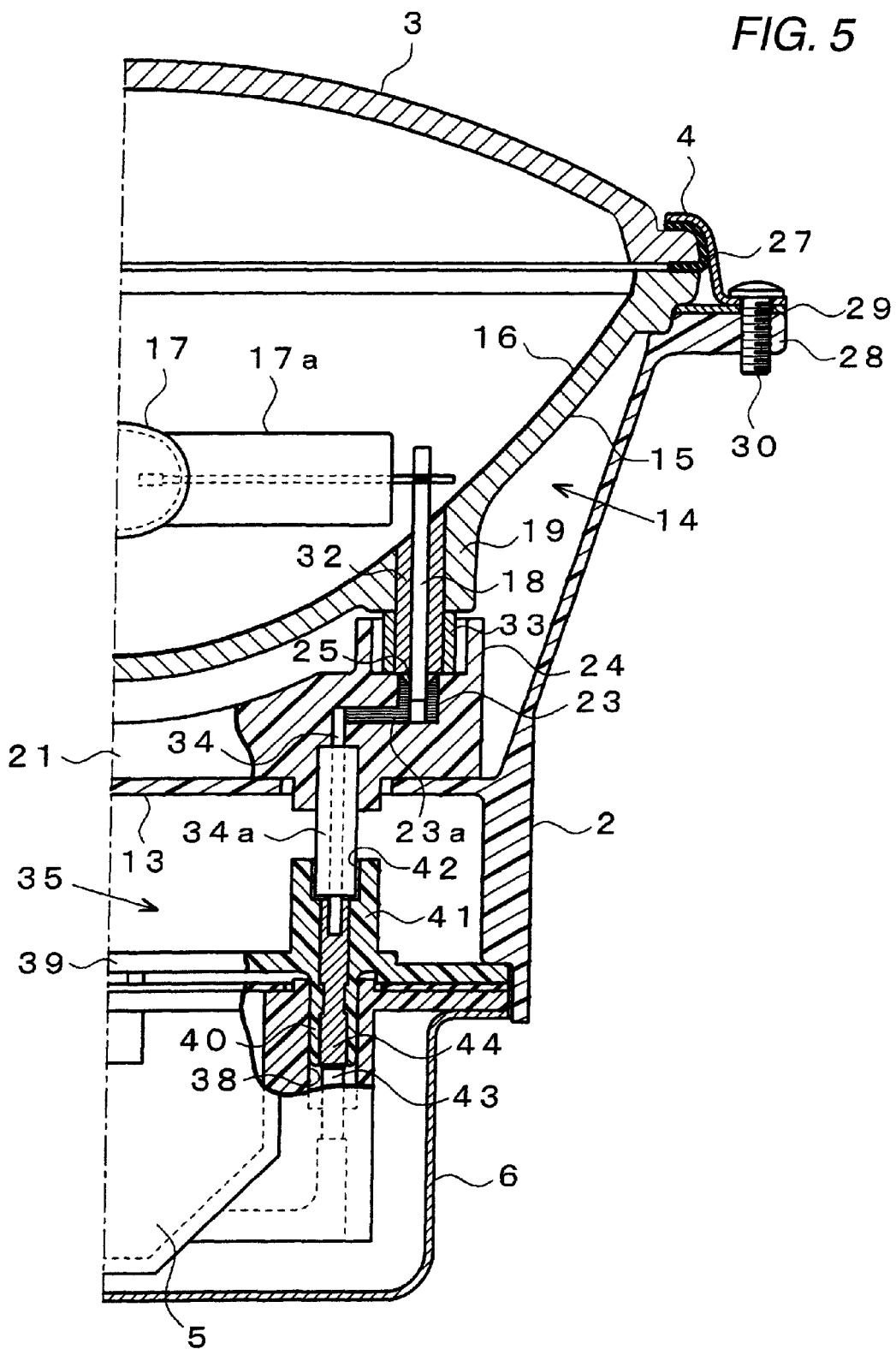
FIG. 5 is a partial sectional view showing a heat and electricity insulating construction of the lamp.

As is shown in FIG. 5, in an assembled state, the light transmissive cover 3 and the reflector 15 are held to the front housing 2 by the retainer 4 in such a state that respective circumferential portions thereof are joined together. A gasket 27 is attached to the circumferential portion of the light transmissive cover 3, and another gasket 29 is interposed between the reflector 15 and a flange portion 28 of the front housing 2. The retainer 4 is formed into an annular shape so as to surround the light transmissive cover 3 and is attached to the flange portion 28 with a plurality of screws 30. In addition, the light transmissive cover 3 and the reflector 15 are fastened to the front housing 2 by the retainer 4, and the reflector 15 is securely held between the light transmissive cover 3 and the lamp socket 21, so that the electrode terminals 18 are made to be held in a state in which they are kept connected with the corresponding metallic terminal devices 23.

The electrode terminal 18 is secured to the corresponding seating portion 19 of the reflector 15 by an insulating ceramic adhesive 32, and an exposed portion of the adhesive 32 is insulated and protected by a base 33. The power supply terminal 23 of the lamp socket 21 includes a connecting portion 23*a*, which is parallel to the light emitting tube 17*a* of the discharge lamp 17, and the insertion port 25 for the electrode terminal 18 is formed at one end of the connecting portion 23*a*, while a front end of a high-voltage electrical power line 34 is connected to the other end of the connecting portion 23*a*. The high-voltage electrical power line 34 is covered by an insulating film 34*a* which is made of a silicone rubber. A front end portion of the insulating film 34*a* is embedded in the insulating material of the lamp socket 21, and the remaining portion of the insulating film 34*a* is made to project into the heat and electricity insulating air layer 35, which is formed on a rear side of the bulkhead 13. Then, the electrode terminal 18, the metallic terminal device 23 and the high-voltage electrical power line 34 are all covered by an insulating material so as to ensure a long creeping distance along the power supply path to the discharge lamp 17, whereby a creeping discharge leak between metallic members such as the front housing 2 and the screws 9 is prevented in an ensured fashion, so as to enhance the insulating performance on the periphery of the discharge lamp 17.

As is shown in FIGS. 3 and 5, the igniter 5 for activating the discharge lamp 17 is accommodated inside the rear housing 6, and the rear housing 6 is attached to a rear end face of the front housing 2 (an attaching surface of the igniter 5) with a plurality of screws 37. The rear end face of the front housing 2 extends at right angles to the attaching direction of the reflector 15, and leg portions 40 of an igniter socket 39 are detachably inserted into a pair of insertion holes 38, which are formed in a front surface of the igniter 5. The igniter socket 39 is formed from an insulating material such as resin or ceramic and includes socket portions 41 on an opposite side thereof where the leg portions 40 are formed so as to project into the air layer 35. A connecting port 42 into which the high-voltage electrical power line 34 and a rear end portion of the insulating film 34*a* thereof are detachably inserted is formed in the socket portion 41, and a connecting conductor 44 is embedded in the socket portion 41 for electrically connecting the connecting port 42 to an output terminal 43 of the igniter 5. In addition, so as to ensure a high degree of insulation at a connecting portion between the high-voltage electrical power lines 34 and the igniter 5, the portions of the high-voltage electrical power lines 34, which pass through the air layer 35, are made to be covered by the insulating films 34*a*. An electronic circuit (whose illustration is omitted) is electrically connected to the metallic terminal devices 23 of the lamp socket 21.

Consequently, according to one or more embodiments of the aircraft lamp 1 configured as described above, one or more of the following functions and advantages will be provided.

(a) Because the air layer 35 is formed between the igniter 5 and the lamp socket 21, the quantity of heat that is conducted from the discharge lamp 17 to the igniter 5 is reduced, thereby making it possible to protect, in an ensured fashion, electronic parts in the igniter 5 from air heated to high temperatures.

(b) Because infrared light from the discharge lamp 17 is made to be transmitted towards the air layer 35 by the reflecting film of the reflector 15, the air layer 35 is made to function not only to insulate the igniter 5 from heat from the discharge lamp 17, but also, to cool the periphery of the discharge lamp 17, thereby making it possible to enhance the heat resistant performance of the aircraft lamp 1.

(c) Because the discharge lamp 17 is disposed horizontal relative to the attaching direction of the reflector 15, a predetermined area on the periphery of the aircraft can be illuminated brightly.

(d) Because the lamp socket 21 and the igniter 5 are disposed at right angles to the attaching direction of the reflector 15 and the air layer 35 is formed therebetween, the reflector 15 can be detachably accommodated in the interior of the front housing 2 without reducing the volume of the insulating air layer 35.

(e) Because the metallic terminal devices 23 are embedded in both the end portions of the lamp socket 21, which is made longer than the light emitting tube 17a of the discharge lamp 17, the high-degree of insulation can be ensured at the connecting portions between the electrode terminals 18 and the metallic terminal devices 23.

(f) Because the socket portions 41 of the igniter 5 are made to project into the air layer 3 and the portions of the high-voltage electrical power lines 34 are made to be covered by the insulating films 34a, the high-degree of insulation can be ensured between the lamp socket 21 and the igniter 5 without reducing the volume of the insulating air layer 35.

(g) Because the electrode terminals 18 can be connected to and disconnected from the power supply terminals 23 by the discharge lamp 17 being made to be integrated into the reflector 15 and the reflector 15 being made to be attached to and detached from the lamp socket 21, the labor hours required to disconnect and reconnect the electric wiring can be eliminated, thereby making it possible to carry out the maintenance work of the discharge lamp 17 for inspection and replacement simply and quickly within a limited period of time.

(h) In such a state that the lamp 1 is built up, because the reflector is securely held between the light transmissive cover 3 and the lamp socket 21 by making use of the retainer 4, which is the constituent component for attaching the light transmissive cover 3 in place, the electrode terminals 18 can be connected to the power supply terminals 23 simply and in an ensured fashion without having to use a separate component.

(i) Because the discharge lamp 17 is disposed so that the light emitting tube 17a becomes horizontal relative to the direction in which the reflector 15 is attached and detached, the light of the discharge lamp 17 can be made to be reflected on the reflecting surface 16 of the reflector 15 so as to illuminate brightly the predetermined area on the periphery of the aircraft.

(j) Because the igniter 5 is assembled to the front housing 2 and the high-voltage electrical power lines 34 of the lamp socket 21 are connected to the socket portion 41 of the igniter 5, not only can the discharge lamp 17 which outputs a large quantity of light be lit in an ensured fashion without dropping the starting voltage, but also, the igniter 5 can be detached from the lamp socket 21 for easy maintenance.

(k) Because the igniter 5 is made to be accommodated inside the rear housing 6, which is disposed at the rear end of the front housing 2, not only can the igniter 5 be protected by the cover 6, but also, the igniter 5 can be arranged in the same direction as that in which the reflector 15 is attached and detached so as to make the whole of the lamp 1 smaller in size.

The invention is not limited to the exemplary embodiment that has been described heretofore, and hence, as will be illustrated below, the invention can be carried out by modifying arbitrarily the configurations of the respective portions of the aircraft lamp 1 without departing from the spirit and scope of the invention. Some exemplary modifications in accordance with one or more embodiments of the present invention are presented below.

(1) The light transmissive cover 3 shown in FIG. 1 can be modified into an oval shape, a quadrangular shape, a polygonal shape, and the like, as required in accordance with types and applications of the lamp 1.

(2) The lamp socket 21 shown in FIG. 3 can be formed into a circular shape, so that the air layer 35 is formed between an end face of the lamp socket 21 and a front end face of the igniter 5.

(3) The igniter socket 39 can be removed from the igniter 5, so that the socket portions 41 are provided integrally on a front surface of the igniter 5.

While the invention has been described in connection with the exemplary embodiments, it will be obvious to those skilled in the art that various changes and modifications may be made therein without departing from the present invention, and it is aimed, therefore, to cover in the appended claim all such changes and modifications as fall within the true spirit and scope of the present invention.

What is claimed is:

1. An aircraft lamp comprising:
a housing capable of being attached to a body of an aircraft;
a discharge lamp;
a reflector which reflects visible light from the discharge lamp;
a light transmissive cover which transmits reflected light from the reflector to a front side of the housing;
a lamp socket connected electrically to the discharge lamp and an igniter which activates the discharge lamp; and
a high-voltage electrical power line that electrically connects the lamp socket with the igniter,
wherein the discharge lamp, the reflector, the light transmissive cover, the lamp socket, and the igniter are provided within the housing,
wherein a heat insulating air layer is provided between the lamp socket and the igniter,
wherein the high-voltage electrical power line is provided so as to pass through the heat insulating air layer,
wherein the reflector is attached to the lamp socket,
wherein a supporting surface of the lamp socket and an attaching surface of the igniter are disposed so as to be substantially at right angles to a direction in which the reflector is attached in the housing, and
wherein the air layer is formed between the supporting surface and the attaching surface.

2. The aircraft lamp as set forth in claim 1,
wherein the reflector is molded from a light transmissive material, and
wherein a reflecting film, which transmits infrared light of the discharge lamp towards the air layer, is provided on a front surface of the reflector.

3. The aircraft lamp as set forth in claim 1,
wherein the lamp socket is made of an insulating material,
wherein a length of the lamp socket is longer than a length of a light emitting tube of the discharge lamp,
wherein electrode terminals are provided at longitudinal ends of the light emitting tube, and
wherein metallic terminal devices, to which the electrode terminals are detachably attached, are embedded in end portions of the lamp socket.

4. The aircraft lamp as set forth in claim 3,
wherein the igniter comprises a socket portion which is made of an insulation material and projects into the air layer,
wherein one end of the high-voltage electrical power line is connected electrically to the terminal, and the other end of the high-voltage electrical power line is connected electrically to a connecting conductor which is embedded in the socket portion, and
wherein a portion of the high-voltage electrical power line which passes through the air layer is covered with an insulating film.

5. An aircraft lamp comprising:
a housing capable of being attached to a body of an aircraft;
a light transmissive cover attached to a front side of the housing;
a reflector accommodated inside the housing;
a light source fixed to a front side of the reflector;
an electrode terminal for the light source provided on a rear surface of the reflector so as to project therefrom; and
a lamp socket comprising a power supply terminal provided in a rear side of the housing,
wherein the reflector is detachably attached to the lamp socket so that the electrode terminal is electrically connected to the power supply terminal when the reflector is attached to the lamp socket,
wherein the aircraft lamp further comprises a retainer which fastens the light transmissive cover to the housing, and
wherein the retainer securely holds the reflector between the light transmissive cover and the lamp socket.

6. The aircraft lamp as set forth in claim 5,
wherein the light source is a discharge lamp, and
the discharge lamp is disposed so that a light emitting tube thereof becomes perpendicular to a direction in which the reflector is attached or detached.

7. The aircraft lamp as set forth in claim 5, further comprising:
an igniter, which activates the discharge lamp, assembled to the housing, and
a high-voltage electrical power line electrically connected to a socket portion of the igniter.

8. The aircraft lamp as set forth in claim 5, the housing comprising:
a front housing and a rear housing attached to a rear end of the front housing,
wherein the light source is accommodated inside the front housing, and
wherein the igniter is accommodated inside the rear housing.

9. An aircraft lamp comprising:
a housing capable of being attached to a body of an aircraft;
a light source;
an igniter which activates the light source;
a reflector which reflects visible light from the light source;
a light transmissive cover which transmits reflected light from the reflector to a front side of the housing;
a lamp socket electrically connected to the light source and the igniter; and
a high-voltage electrical power line that electrically connects the lamp socket with the igniter,
wherein the light source, the reflector, the light transmissive cover, the lamp socket, and the igniter are disposed within the housing,
wherein a heat insulating air layer is provided between the lamp socket and the igniter,
wherein the high-voltage electrical power line is provided so as to pass through the heat insulating air layer,
wherein the reflector is molded from a light transmissive material, and
wherein a reflecting film, which transmits infrared light of the light source towards the air layer, is provided on a front surface of the reflector,
wherein the reflector is attached to the lamp socket,
wherein a supporting surface of the lamp socket and an attaching surface of the igniter are disposed so as to be substantially at right angles to a direction in which the reflector is attached in the housing, and
wherein the air layer is formed between the supporting surface and the attaching surface.

10. The aircraft lamp as set forth in claim 9,
wherein the lamp socket is made of an insulating material,
wherein a length of the lamp socket is longer than a length of a light emitting tube of the light source,
wherein electrode terminals are provided at longitudinal ends of the light emitting tube,
wherein metallic terminal devices, to which the electrode terminals are detachably attached, are embedded in end portions of the lamp socket, and
wherein the reflector is detachably attached to the lamp socket so that the electrode terminals are electrically connected to the metallic terminal devices when the reflector is attached to the lamp socket.

11. The aircraft lamp as set forth in claim 10,
wherein the igniter comprises a socket portion which is made of an insulation material and projects into the air layer,
wherein one end of the high-voltage electrical power line is connected electrically to the metallic terminal devices, and the other end of the high-voltage electrical power line is connected electrically to a connecting conductor which is embedded in the socket portion, and
wherein a portion of the high-voltage electrical power line which passes through the air layer is covered with an insulating film.

12. The aircraft lamp as set forth in claim 11, the housing comprising:
a front housing and a rear housing attached to a rear end of the front housing,
wherein the light source is accommodated inside the front housing, and
wherein the igniter is accommodated inside the rear housing.

13. The aircraft lamp as set forth in claim 12,
wherein the light source is a discharge lamp, and
wherein the discharge lamp is disposed so that a light emitting tube thereof becomes perpendicular to a direction in which the reflector is attached or detached.

14. The aircraft lamp as set forth in claim 13, further comprising:
a retainer which fastens the light transmissive cover to the housing,
wherein the retainer securely holds the reflector between the light transmissive cover and the lamp socket.

* * * * *